United States Patent [19]

Muraji et al.

[11] Patent Number: 5,260,797
[45] Date of Patent: Nov. 9, 1993

[54] PROJECTION TYPE IMAGE DISPLAY APPARATUS WITH CIRCUIT FOR CORRECTING LUMINANCE NONUNIFORMITY

[75] Inventors: Tsutomu Muraji, Nara; Mitsuru Kotaka, Sakai, both of Japan

[73] Assignee: Matsushita Electric Industrial Co., Ltd., Osaka, Japan

[21] Appl. No.: 534,275

[22] Filed: Jun. 7, 1990

[30] Foreign Application Priority Data

Jun. 8, 1989 [JP] Japan ................. 1-145948

[51] Int. Cl.$^5$ .................... H04N 5/74; H04N 9/31
[52] U.S. Cl. .................... 358/231; 358/60; 358/51
[58] Field of Search ........... 358/231, 60, 61, 63, 358/232, 233, 235, 236, 51, 64; 362/13

[56] References Cited

U.S. PATENT DOCUMENTS

| | | | |
|---|---|---|---|
| 3,760,096 | 9/1973 | Roth | 358/63 |
| 4,368,963 | 1/1983 | Stolov | 358/61 |
| 4,549,117 | 8/1985 | Takahashi et al. | 358/51 |
| 4,658,297 | 4/1987 | Nomura et al. | 358/176 |
| 4,672,457 | 6/1987 | Hyatt | 358/60 |
| 4,868,668 | 9/1989 | Tavernetti | 358/231 |

FOREIGN PATENT DOCUMENTS

| | | |
|---|---|---|
| 1238410 | 1/1986 | Canada . |
| 2811715A1 | of 0000 | Fed. Rep. of Germany . |
| 59-167187 | 9/1984 | Japan . |
| 62-217224 | 9/1984 | Japan . |
| 63-268380 | 11/1985 | Japan . |
| 61-270741 | 1/1986 | Japan . |
| 1-1236876 | 9/1989 | Japan . |
| 0037886 | 2/1990 | Japan . |
| WO88/01823 | 3/1988 | PCT Int'l Appl. . |

OTHER PUBLICATIONS

"LCD Full-Color Video Projector", Morozumi et al.; SID 86 Digest, pp. 375-378.

*Primary Examiner*—James J. Groody
*Assistant Examiner*—Glenton B. Burgess
*Attorney, Agent, or Firm*—Wenderoth, Lind & Ponack

[57] ABSTRACT

A projection type image display apparatus using a light modulation image display device as a light valve varies the voltage of a video signal so as to correct the nonuniformity of luminance of the optical device so that an image uniform in brightness and color even in peripheral parts can be displayed on a projection screen. A driving circuit contained with the apparatus generates three driving signals for driving three image display devices in accordance with red, green and blue color component signals of an input video signal. The driving circuit includes a correction circuit for correcting the red and blue color component signals independently of one another so that their luminance is commensurate with that of the green color component signal.

4 Claims, 8 Drawing Sheets

PROJECTION TYPE IMAGE DISPLAY APPARATUS WITH CIRCUIT FOR CORRECTING LUMINANCE NONUNIFORMITY

BACKGROUND OF THE INVENTION

1. Field of the Invention

The present invention relates to a projection type image display apparatus using a light modulation image display device including a liquid crystal display device as a light valve.

2. Description of the Prior Art

For image display on a wide screen, hitherto, a method of forming an optical image corresponding to a video signal changes the optical characteristics of on a relatively small light valve, illuminates this optical image with illuminating light and magnifies and projects this image on a screen using a projection lens is widely known. In this sort of projection type image display apparatus, the resolution of the projected image is determined by the resolution of the light valve, and when the light source is intensified, the light output becomes larger, and therefore by using a light valve of high resolution, a projection type image display apparatus of large light output and high resolution may be realized even if the display area is small. Recently, a method of using a liquid crystal display device as the light valve is noticed. For example, Morozumi et al. proposed, in "LCD Full-Color Video Projector," SID 86 Digest, p. 375, a method of obtaining a full-color projected image by using three liquid crystal display devices.

The structure of a conventional example of projection type image display device using such liquid crystal display device as the light valve is described below. The light released from the lamp is converted into a nearly parallel light by a focusing optical display device, and passes through the liquid crystal display device and enters the projection lens. In the liquid crystal display device, an optical image corresponding to a video signal obtained from an image display circuit is formed as change in the transmissivity, and this optical image is projected on the screen by the projection lens. As the lamp, a halogen lamp, a xenon lamp, or a metal halide lamp may be used.

The image display circuit comprises a video signal demodulation circuit, a common voltage generation circuit for generating a voltage to be applied to the counter-electrode of the liquid crystal display device (hereinafter called the common voltage), and a video signal output circuit for inverting the polarity of the video signal demodulated in the video signal demodulation circuit at field intervals with respect to the common voltage in order to drive the liquid crystal display device with an alternating current.

In such a conventional projection type image display apparatus, however, owing to the peripheral dimming characteristics of the projection lens, assuming that the image angle of the projection lens to the screen to be $\omega$, the brightness of the peripheral part as compared with the central part on the screen of the projected image is lowered in proportion to $\cos^4\omega$.

Besides, in order to correct the luminance gradient due to the difference between the effective voltage of the signal applied to the upper portion of the screen of the liquid crystal display device and the effective voltage of the signal applied to the lower portion, a method of applying a correction voltage to the common electrode was proposed (see Japanese Patent Publication Sho. 62-217224).

When the liquid crystal display appearance is used in the projection type image display apparatus, however, the peripheral dimming characteristics of the projection lens are not fully corrected by the correction of the luminance gradient in the vertical direction of the screen alone.

SUMMARY OF THE INVENTION

It is hence a primary object of the invention to present a projection type image display apparatus capable of displaying an image uniform in brightness and color even in peripheral parts on a projected screen.

To achieve the above object, the invention presents a projection type image display apparatus which comprises:

a lamp;

a circuit for lighting said lamp;

three image display devices each for modulating a light in accordance with a driving signal;

a first optical device for respectively guiding light of red, green and blue components from said lamp to said three image display devices;

a second optical device comprising three projection lenses for projecting light modulated by said three image display devices on a screen to form a color image in which a luminance distribution on said screen by each of said three projection lenses is nonuniform; and a driving circuit for generating three driving signals in accordance with red, green and blue color component signals of an input video signal, and for respectively feeding said three driving signals into said three image display devices, said driving circuit including a signal correction circuit for correcting said red and blue color component signals independently of one another so that a luminance distribution on said screen by each of said three projection lenses becomes a predetermined nonuniform luminance distribution according to the predetermined correction data, thereby correcting the nonuniformity of the luminance caused by the optical device.

In this constitution, even by projecting the light modulated by the video display device on the screen to generate an image, an image uniform in brightness and color even in peripheral parts can be displayed on the projection screen.

The red and blue color component signals of an input video signal are corrected independently of one another so that their luminance is commensurate with that of the green color component signal.

Other features and effects of the invention will be better understood and appreciated from the following detailed description of embodiments taken in conjunction with the accompanying drawings.

DESCRIPTION OF THE PREFERRED EMBODIMENTS

Referring now to the drawings, some of the preferred embodiments of the present invention are described in detail below.

Figure 1:
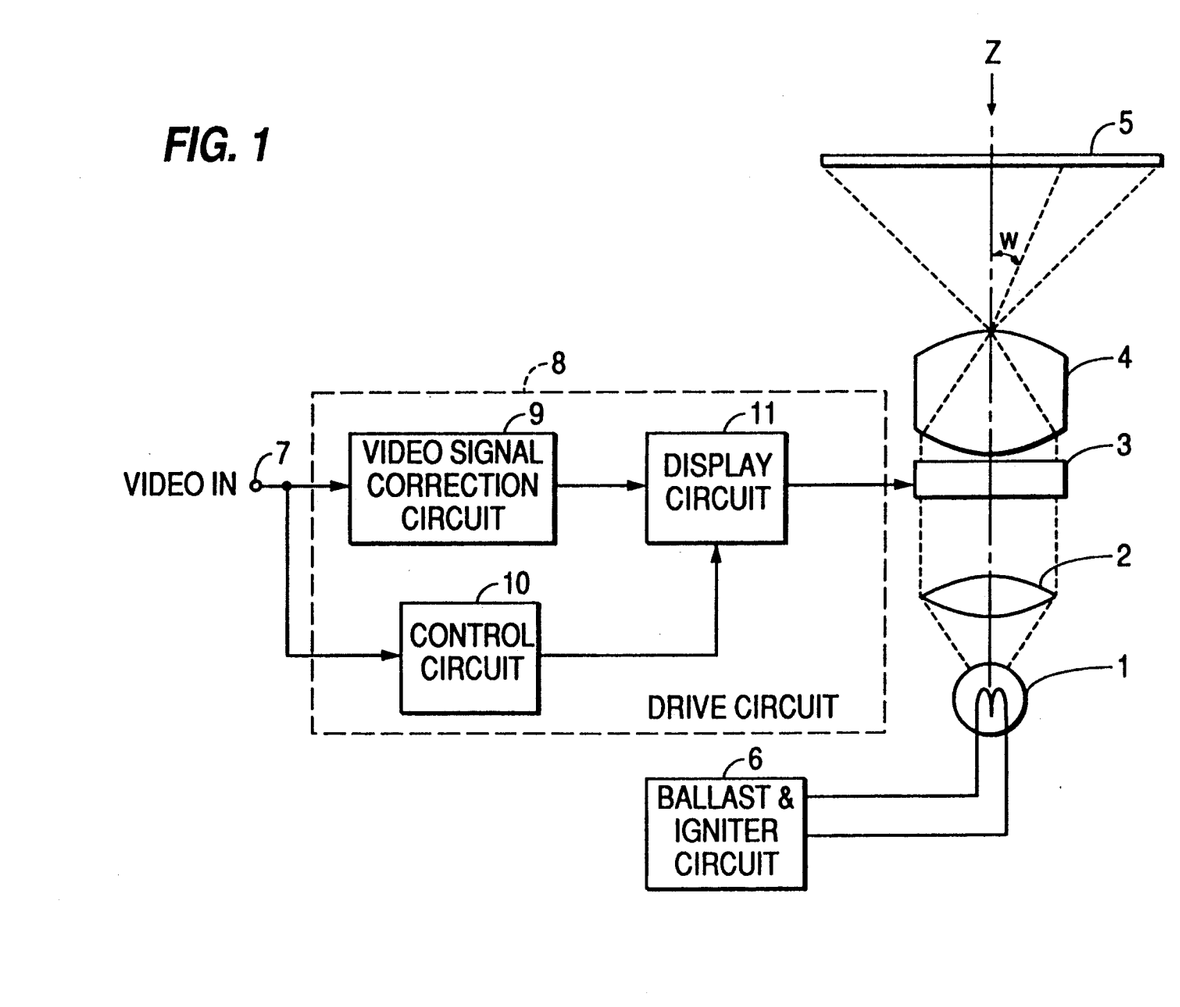
FIG. 1 is a block diagram of an essential part of a projection type image display apparatus in accordance with a first embodiment of the present invention.

FIG. 1 is a block diagram showing a structure of a portions of an apparatus in accordance with a first embodiment of the present invention.

In FIG. 1, the light generated from a lamp 1 driven by ballast and igniter circuit 6 is converted into a nearly parallel light beams in a focusing optical device 2, and passes through an image display device 3 and enters a projection lens 4. The image display device 3 is an active matrix type liquid crystal display device, in which, in response to an output driving signal of a drive circuit 8, an optical image corresponding to a video signal is formed as a change in the transmissivity. This optical image is projected on a screen 5 by the projection lens 4. The lamp 1 is a metal vapor discharge lamp such as a metal halide lamp, a mercury lamp or a sodium lamp. In particular, the metal halide lamp is excellent in lamp efficiency and lamp life, and its light emission spectrum is suitable for the image display device.

The video signal entering an input terminal 7 has its signal amplitude corrected in a video signal correction circuit 9, and the image display device 3 is driven through a display circuit 11. At this time, the amount of correction of the signal amplitude, that is, the rate of change of the video signal voltage is controlled by a control circuit 10. The video signal correction circuit 9, display circuit 11 and control circuit 10 constitute the drive circuit 8.

Figure 2A:
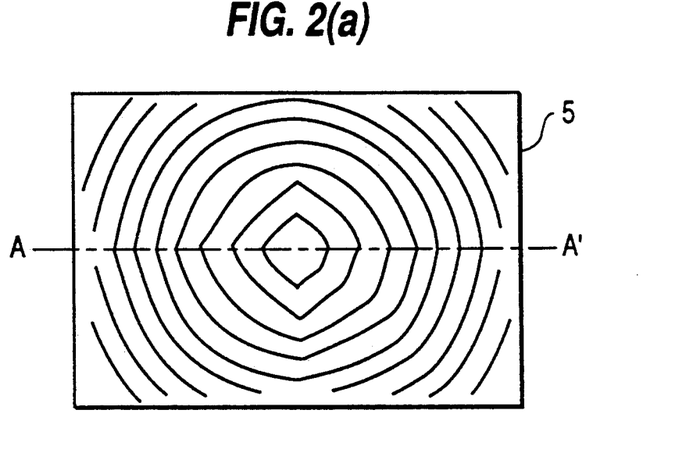
FIGS. 2(a)–2(c) are diagrams showing the relationship between the illumination distribution and the driving signal of a projected image in accordance with the first embodiment of the present invention.
Figure 2B:
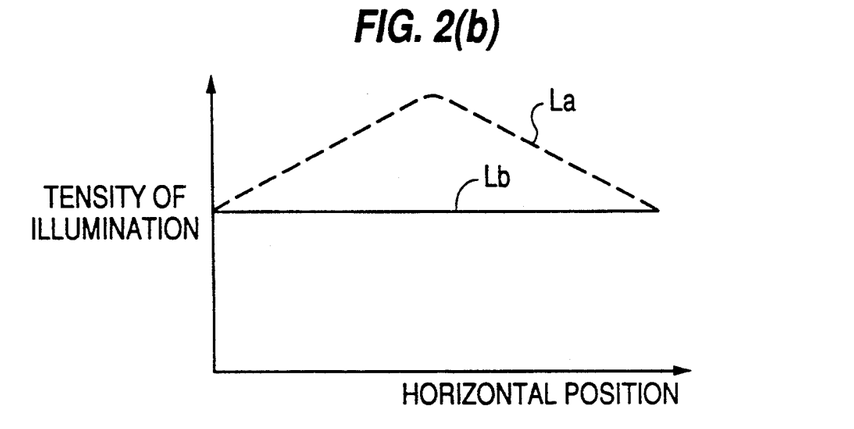
Figure 2C:
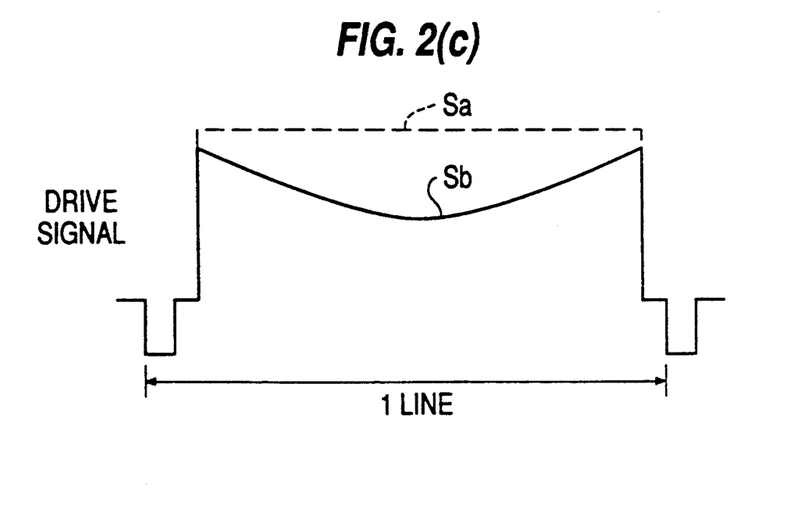

The operation of the thus composed projection type image display apparatus, is described below. FIGS. 2(a)-2(c) show the relationship between the illumination distribution and the driving signal of projected image on the screen 5. When the image display device 3 is driven by a raster signal, the light transmissivity becomes constant in the whole display region of the image display device 3. In the imaging optical system, however, the illumination E on the screen 5 is expressed as follows, assuming that the aperture factor of the projection lens is K and the image angle of the projection lens is ω, $$E = E_0 K \cos^4 \omega$$

where $E_0$ is the intensity of illumination on the screen 5 on the optical axis of the projection lens. Therefore, owing to the peripheral dimming characteristics of the projection lens 4, the projected image on the screen 5 is lowered in the luminance in the peripheral parts as compared with the central part. FIG. 2 (a) denotes a distribution of uniform illumination curves on the screen 5 as seen in the Z-direction in FIG. 1. For example, the intensity of illumination of the single-dot chain line A—A' in FIG. 2 (a) is as shown in dotted line La in FIG. 2 (b), and it becomes darker in the peripheral parts. At this time, the signal voltage for driving the image display device 3 is indicated by dotted line Sa in FIG. 2 (c). Accordingly, when the signal voltage for driving the image display device 3 is designed as indicated by solid line Sb in FIG. 2 (c) so that the voltage to drive the central part may be lower than the voltage to drive the peripheral parts, the intensity of illumination on the single-dot chain line A—A' in FIG. 2 (a) becomes uniform as indicated by solid line Lb in FIG. 2 (b). By sequentially correcting the signal voltage for driving the image display device in the vertical direction, a projected image of uniform brightness is obtained on the entire screen.

Figure 3:
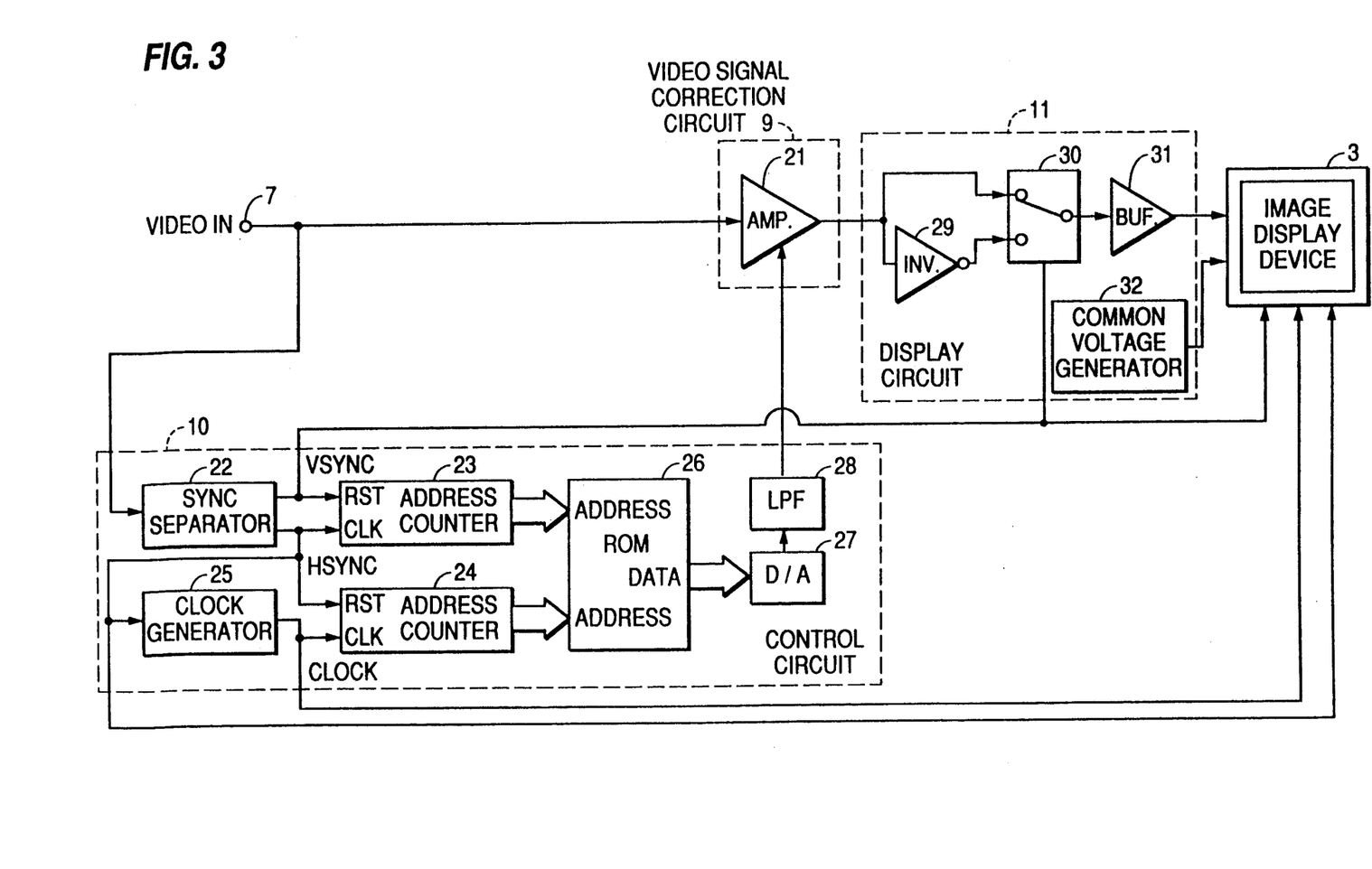
FIG. 3 is a driving circuit block diagram of an image display device in accordance with the first embodiment of the present invention.

The video signal of solid line Sb in FIG. 2 (c) for driving the image display device 3 is realized by a driving circuit as shown in FIG. 3. In FIG. 3, as the video signal correction circuit 9 shown in FIG. 1 a voltage-controlled type variable amplifier 21 is used. The control circuit 10 comprises a synchronous separator circuit 22, address counters 23 and 24, a clock generator 25, a read-only memory (ROM) 26, a digital-to-analog converter (D/A converter) 27, and a lowpass filter (LPF) 28.

First, the video signal entering the input terminal 7 is separated into a vertical sync signal (Vsync) and a horizontal sync signal (Hsync) in the synchronous separator circuit 22. In the address counter 23, the horizontal sync (Hsync) signals are counted on the basis of the vertical sync (Vsync) signal separated in the synchronous separator circuit 22, and an address indicating the position in the vertical direction, of the screen is generated and supplied to the ROM 26. On the other hand, in the address counter 24, on the basis of the horizontal sync signal, the clocks locked on the horizontal sync signal generated in the clock generator 25 are counted, and an address indicating the position in the horizontal direction of the screen is generated and supplied to the ROM 26. In the ROM 26, preliminarily, a table of digital data for controlling the amplification factor of the variable amplifier 21 is stored, and the digital data delivered from the address counters 23 and 24 are specified. The digital data delivered from the ROM 26 is converted into an analog signal in the D/A converter 27, and this analog signal is fed into the variable amplifier 21 through the LPF 28.

Figure 4:
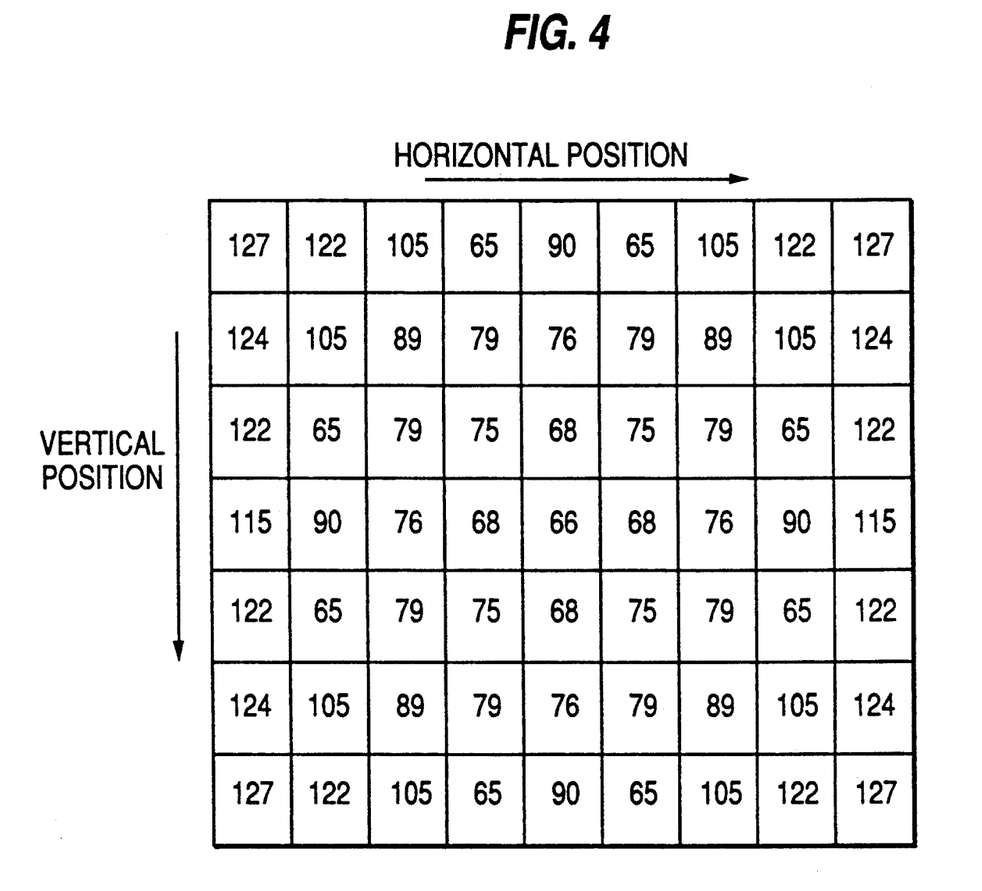
FIG. 4 is a table of digital data to be stored in a read-only memory in accordance with the first embodiment of the present invention.

Since the table of the digital data considering the dimming characteristic of the projection lens 4 is stored in the ROM 26, the input video signal has its signal amplitude changed by the variable amplifier 21, and the corrected video signal, as indicated by solid line Sb in FIG. 2 (c), is obtained. For example, as an example of the table of the digital data to be stored in the ROM 26, a table as shown in FIG. 4 is prepared. The table shown in FIG. 4 is an example when the center of the image display device 3 is on the optical axis of the projection lens 4 on a screen with the horizontal-to-vertical ratio of 4:3.

Figure 5:
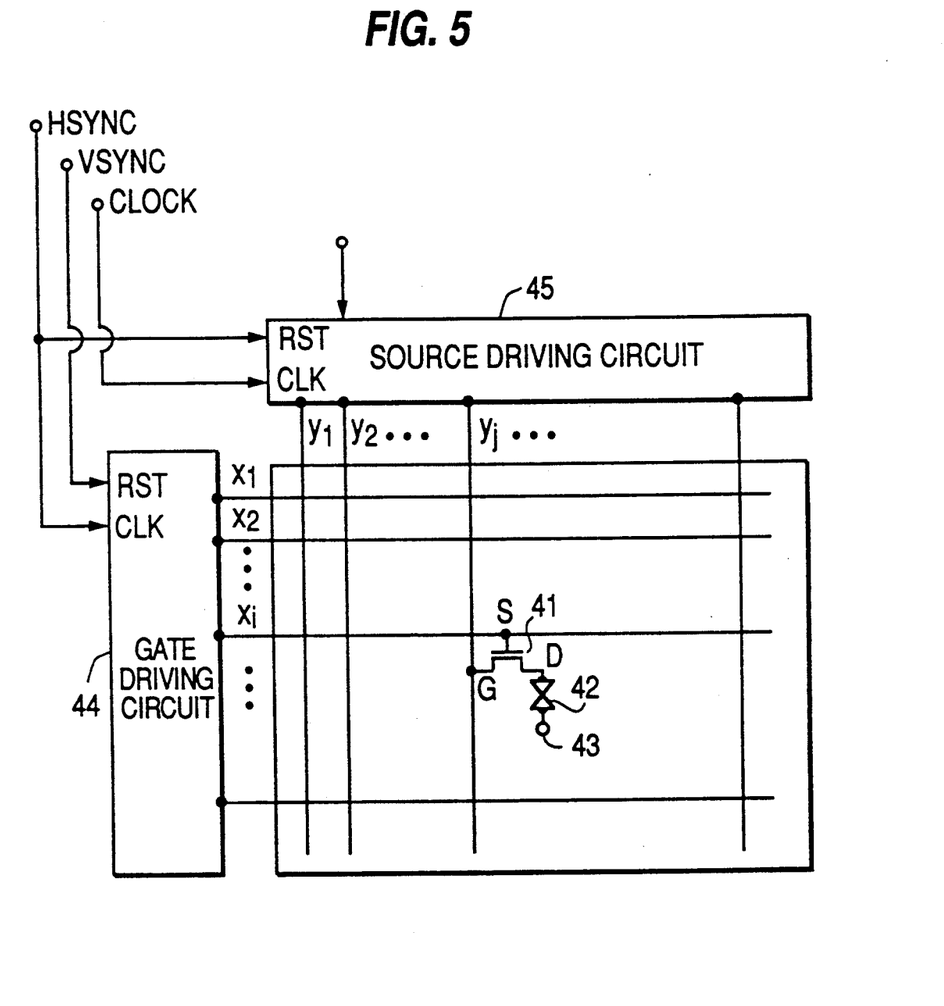
FIG. 5 is a block diagram of portions of an active matrix type liquid crystal display device used as an example of an image display device.

The image display device 3 is an active matrix type liquid crystal display device as shown in FIG. 5. In FIG. 5, the liquid crystal panel 3 is a matrix liquid crystal panel having gate bus lines xi and source bus lines yj disposed in a matrix, and each picture element is composed of a thin film transistor 41 used as a switching element and a liquid crystal cell 42. The gate of the thin film transistor 41 is connected to a gate bus line xi, and its source is connected to a source bus line yj. The liquid crystal cell 42 is connected to the drain of the thin film transistor 41 and to the common electrode 43. A source driving circuit 45 generates a voltage corresponding to the video signal on the source bus line yi, and a voltage is supplied to the liquid crystal cell 42 by turning on the thin film transistor 41 by a scanning signal generated by a gate driving circuit 44.

Referring to FIG. 3, to operate the image display device 3 shown in FIG. 5, the corrected video signal is fed to a changeover circuit 30 of the display circuit 11, and a video signal which has its signal voltage invented in polarity by a polarity inverting circuit 29 and is also fed to the changeover circuit 30 of, the display circuit 11. In the changeover circuit 30, the corrected video signal and the inverted version thereof are changed over at field intervals by the vertical sync signal generated in the synchronous separator circuit 22. The signal whose polarity is inverted at field intervals by the changeover circuit 18 is fed into the image display device 3 through an output buffer 31. A specified voltage is supplied by a common voltage generating circuit 32 to the common electrode 43 of the image display device 3.

In this way, by correcting the amplitude of the video signal in consideration of the dimming characteristics of the projection lens, an image having a uniform brightness in every part of the screen can be displayed on the projection screen.

Explained so far is an example of a correction for making uniform the central brightness and peripheral brightness on the projected image, but the ratio of the peripheral brightness to the central brightness may be easily and arbitrarily set by the table of digital data stored in the ROM 26.

In the foregoing description, meanwhile, an active matrix type liquid crystal display device is used as the image display device, but any other display device may be similarly employed as long as the image may be displayed by a change in the optical characteristics in accordance with electrical signals, such as an electro-optical crystal display device.

Figure 6:
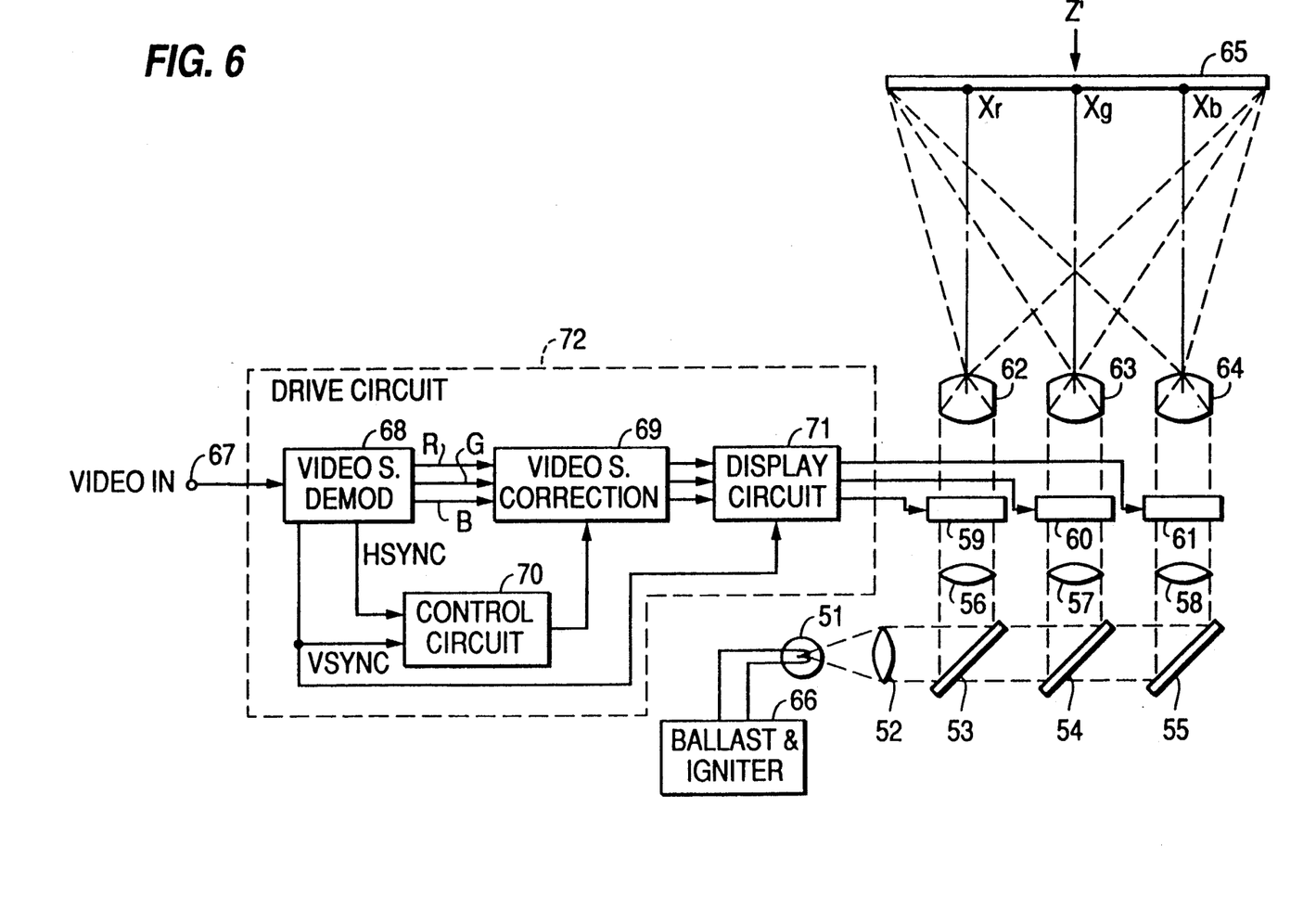
FIG. 6 is a block diagram of portions of a projection type image display apparatus in accordance with a second embodiment of the present invention.
Figure 7A:
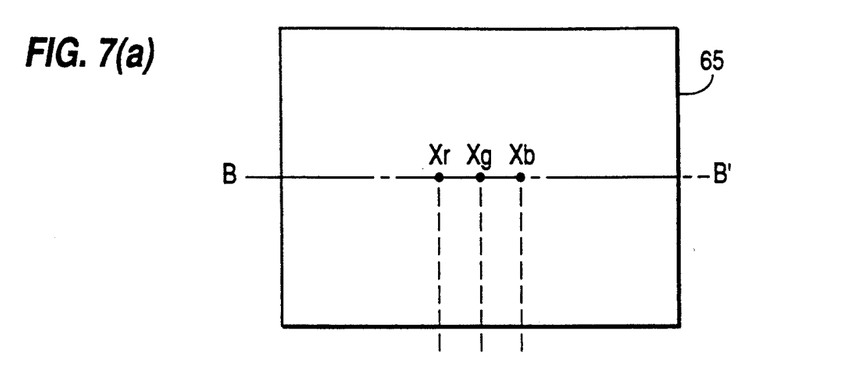
FIGS. 7(a)-7(e) are diagrams showing the relationship between the illumination distribution and the driving signal of a projected image in accordance with the second embodiment of the present invention.
Figure 7B:
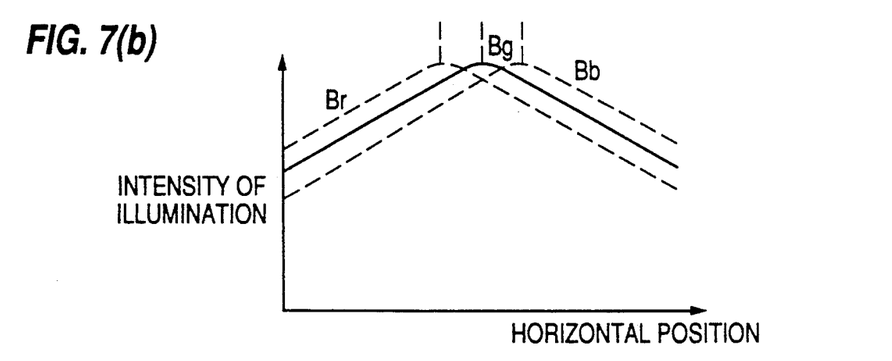
Figure 7C:
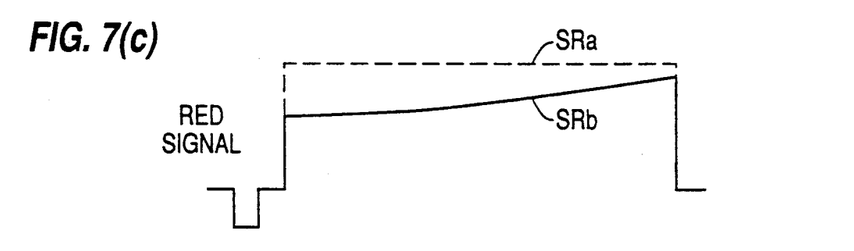
Figure 7D:
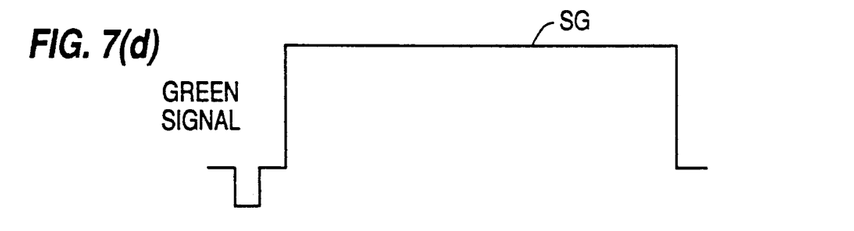
Figure 7E:
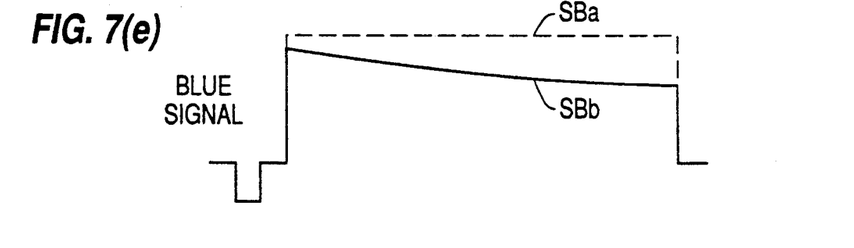

FIG. 6 is a block diagram showing a structure of portions of a second embodiment in accordance with the present invention.

In FIG. 6, the white light generated from a lamp 51 driven by the ballast and igniter circuit 66 is converted into nearly parallel light beams by a focusing optical device 52, and is separated into primary color light beams of red, green and blue by red-reflection dichroic mirror 53, green-reflection dichroic mirror 54, and blue-reflection dichroic mirror 55. The red, green and blue primary color light beams are respectively guided to image display devices 59, 60 and 61 by corresponding field lenses 56, 57 and 58. Each one of three image display devices 59, 60, and 61 is an active matrix type liquid crystal display device, and an optical image corresponding to the video image is formed as the change of the transmissivity in response to a driving signal from a drive circuit 72. The red, green and blue optical images are magnified and projected by three projection lenses 62, 63 and 64, and are synthesized into a color image on a screen 65 viewed in the Z'-direction. The optical axes of the three projection lenses 62, 63, and 64 are parallel, and extension points of the optical axes of the projection lenses on the screen 65 are respectively Xr, Xg, and Xb. Here, Xb is the center of the screen 65. The screen center of the image display device 60 is located on the optical axis of the projection lens 63, and the screen centers of the image display devices 59 and 61 are shifted from the optical axes of the projection lenses 62 and 64, so that the optical images formed on three image display devices 59, 60, 61 are synthesized on the screen 65.

The video signal entering an input terminal 67 is demodulated into red, green and blue primary signals (R, G, B) in a video signal demodulation circuit 68. Each primary signal has its signal amplitude corrected by a video signal correction circuit 69, and the image display devices 59, 60, and 61 are driven through a display circuit 71. At this time, the signal amplitude correction amount, that is, the rate of change of the video signal voltage is controlled by a control circuit 70. The video signal demodulation circuit 68, video signal correction circuit 69, display circuit 71 and control circuit 70 constitute the drive circuit 72.

The operation of the thus composed projection type image display apparatus is explained below. FIG. 7 (b) represents an illumination characteristic in the horizontal direction B—B' of the central part in the vertical direction of the projected image on the screen 65. When the image display devices 59, 60, and 61 are driven by raster signals, the light transmissivity becomes uniform in the entire display regions of the image display devices 59, 60, 61, but the projected image on the screen 65 is lowered in the illumination in the peripheral parts, with respect to the extension points Xr, Xg, and Xb of the optical axes of the individual projection lenses on the screen 65 due to the peripheral dimming characteristics of the projection lenses 62, 63, and 64. Therefore, the illumination characteristics Br, Bg, and Bb as shown in FIG. 7 (b) are obtained. In other words, when the white balance is appropriate in Xg, the red is intense in Xr and the blue is intense in Xb. The signal voltage for driving the image display device 59 at this time is indicated by dotted line SRa in FIG. 7 (c), and the signal voltage for driving the image display device 60 is indicated by solid line SG in FIG. 7 (d), and the signal voltage for driving the image display device 61 is indicated by the broken line SBa in FIG. 7 (e). Accordingly, by designing the signal voltage for driving the image display device 59 as indicated by solid line SRb in FIG. 7 (c), that is, by setting the signal voltage for driving the left side of the screen lower than the signal voltage of driving the right side of the screen, the illumination characteristic Br in FIG. 7 (b) may be made equal to Bg. Besides, by setting the signal voltage for driving the image display device 61 as shown by solid line SBb in FIG. 7 (e), that is, the signal voltage for driving the right side of the screen lower than the signal voltage for driving the left side of the screen, the illumination characteristic Bb in FIG. 7 (b) may be made equal to Bg. In this way, by sequentially correcting the signal voltages for driving the image display devices 59 and 61 in the vertical direction, a projected image free from unevenness of color can be obtained on the whole screen.

Figure 8:
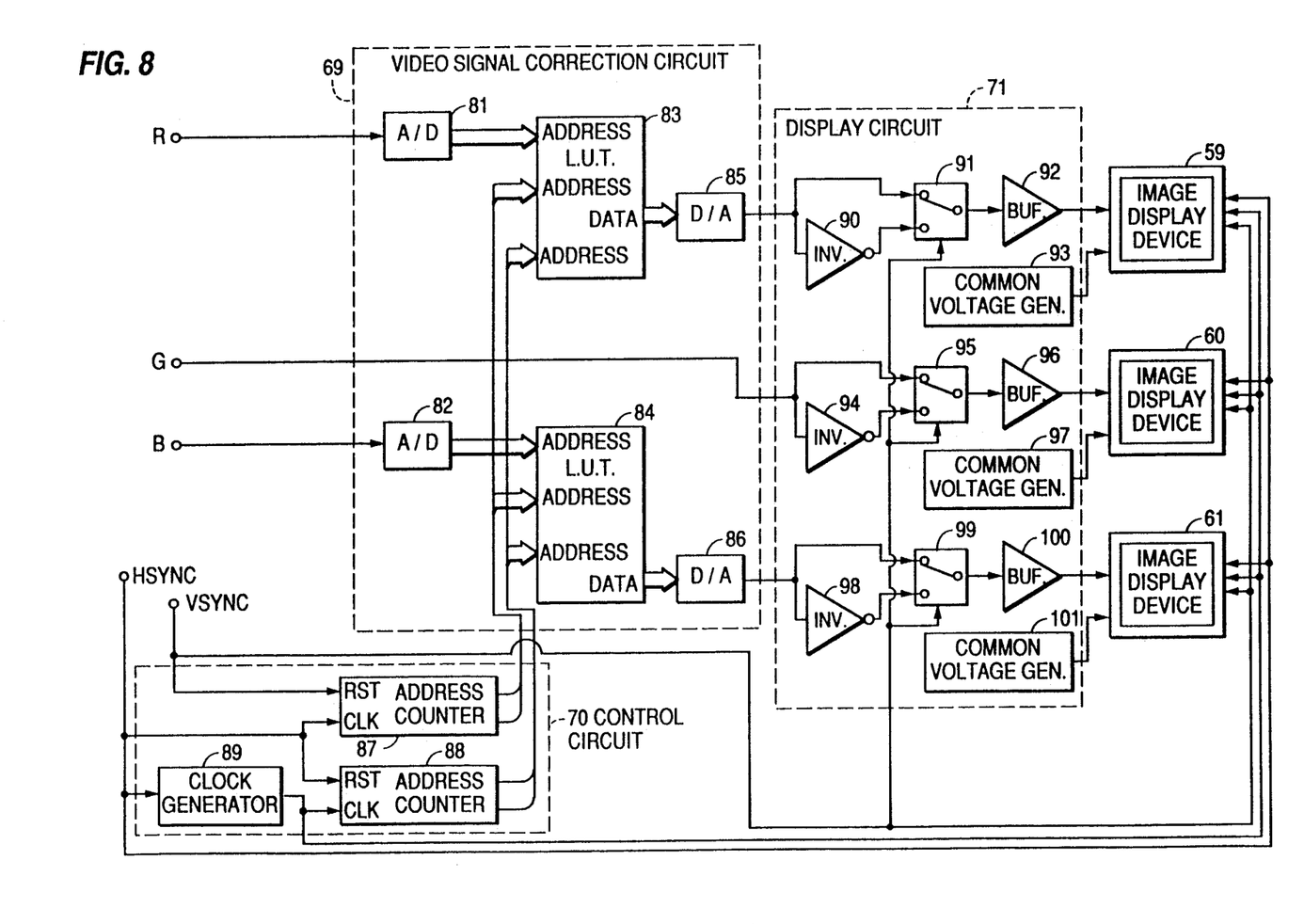
FIG. 8 is a driving circuit block diagram of an image display device in accordance with the second embodiment of the present invention.

The correction of video signal as described above is realized by a circuit composition as shown in FIG. 8. In FIG. 8, look-up table memories (L.U.T. memories) 83 and 84 are used in the video signal correction circuit 69 shown in FIG. 6. The control circuit 70 has address counters 87, 88 and a clock generator 89 arranged in the same composition as shown in the first embodiment in FIG. 3, and addresses indicating the position in the vertical and horizontal directions of the screen are generated. The red signal (R) and blue signal (B) demodulated in the video signal demodulation circuit 68 (in FIG. 6) are converted into digital signals by A/D converters 81 and 82 respectively, and are fed as address signals to the L.U.T. memories 83, 84. Each of the L.U.T. memories 83 and 84 stores a conversion table for converting the video signal amplitude considering the dimming characteristics of the projection lense 62 or 64 beforehand. The selection of conversion tables stored in L.U.T. memories 83 and 84 is effected in accordance with the image display position of the video signal on the basis of the vertical sync signal and horizontal sync signal separated in the video signal demodulation circuit 68, and the video signal amplitude at this time. Thus, the red signal and blue signal have their signal amplitudes converted by A/D converters 81 and 82 and the L.U.T. memories 83 and 84, and are converted to analog signals by the D/A converters 85 and 86, and the corrected primary color signals as shown in FIGS. 7 (c) and 7 (e) are obtained.

The image display devices 59, 60, and 61 are active matrix liquid crystal display devices which are the same as that used in the first embodiment shown in FIG. 5. To operate the image display devices 59, 60, and 61, the three corrected primary color signals of red, green and blue are fed into changeover circuits 91, 95, and 99 of the display circuit 71, and the polarities of the signal voltages are inverted in polarity by the inverting circuits 90, 94, and 98, and these signals are fed into the changeover circuits 91, 95, 99. The changeover circuits 91, 95, and 99 change over the above two input signals at field intervals in response to the vertical sync signal separated in the video signal demodulation circuit 68. The signals inverted in polarity at field intervals by the changeover circuits 91, 95, and 99 are fed into the video display circuits 59, 60, and 61, respectively through output buffers 92, 96, and 100. A specified voltage is supplied to the common electrode of the image display devices 59, 60, and 61 by common voltage generator circuits 93, 97, and 101.

In this way, by correcting the amplitude of video signals in consideration of the dimming characteristics of projection lenses, an image free from uneven color can be displayed on the projection screen.

In the above explanation, the green-reflection dichroic mirror is placed in the center, but the configuration of the dichroic mirrors is not specified, and by the configuration of the dichroic mirrors, the primary signal to be corrected may be selected.

In this embodiment, liquid crystal display devices are used as image display devices, but any other devices may be used, such as electro-optical crystal display devices, as long by the images may be displayed as changes in the optical characteristics in accordance with electrical signals.

Incidentally, the invention is not limited to the illustrated embodiments of projection type image display apparatus using light modulation image display devices as light valves. An important feature of the present invention lies in the correction of dimming characteristic of optical devices by video signals when projecting the optical image formed on the light modulation image display device on the screen, and many other changes and modifications may be considered aside from the embodiments described herein.

What is claimed is:

1. A projection type image display apparatus comprising:
   a lamp;
   a circuit for lighting said lamp;
   three image display devices each for modulating a light in accordance with a driving signal;
   a first optical device for respectively guiding light of red, green and blue components from said lamp to said three image display devices;
   a second optical device comprising three projection lenses for projecting light modulated by said three image display devices on a screen to form a color image in which a luminance distribution on said screen by each of said three projection lenses is nonuniform; and
   a driving circuit for generating three driving signals in accordance with red, green and blue color component signals of an input video signal, and for respectively feeding said three driving signals into said three image display devices, said driving circuit including a signal correction circuit for correcting said red and blue color component signals independently of one another so that a luminance distribution on said screen by each of said three projection lenses becomes a predetermined nonuniform luminance distribution.

2. A projection type image display apparatus comprising:
   a lamp;
   a circuit for lighting said lamp;
   three image display devices each for modulating a light in accordance with a driving signal;
   a first optical device for respectively guiding light of red, green and blue components from said lamp to said three image display devices;
   a second optical device comprising three projection lenses for projecting lights modulated by said three image display devices on a screen to form a color image in which a luminance distribution on said screen by each of said three projection lenses is nonuniform; and
   a driving circuit for generating three driving signals in accordance with red, green and blue color component signals of an input video signal, and for respectively feeding said three driving signals into said three image display devices, said driving circuit including a signal correction circuit for correcting said red and blue color component signals independently of one another so that nonuniform luminance distributions on said screen by said three projection lenses are substantially identical.

3. A projection type image display apparatus comprising:
   a lamp;
   a circuit for lighting said lamp;
   three image display devices each for modulating a light in accordance with a driving signal;
   a first optical device for respectively guiding light of red, green and blue components from said lamp to said three image display devices;
   a second optical device comprising three projection lenses for projecting lights modulated by said three image display devices on a screen to form a color image in which a luminance distribution on said screen by each of said three projection lenses is nonuniform; and a driving circuit for generating three driving signals in accordance with red, green and blue color component signals of an input video signal, and for respectively feeding said three driving signals into said three image display devices, said driving circuit including a signal correction circuit for correcting two specific color component signals out of said red, green and red color component signals independently of the other so that a nonuniform luminance distribution on said screen by each of two specific projection lenses out of said three projection lenses are equal to a nonuniform luminance distribution on said screen by the remaining projection lens.

4. An apparatus according to claim 3, wherein said signal correction circuit comprises two look-up table memories having stored therein predetermined correction data for correcting said two specific color component signals.

* * * * *